Nov. 18, 1958  G. A. LYON  2,860,926
WHEEL COVER
Filed June 7, 1956  2 Sheets-Sheet 1

Inventor
GEORGE ALBERT LYON
by Hill, Sherman, Meroni, Gross & Simpson Attys

Nov. 18, 1958   G. A. LYON   2,860,926
WHEEL COVER
Filed June 7, 1956   2 Sheets-Sheet 2
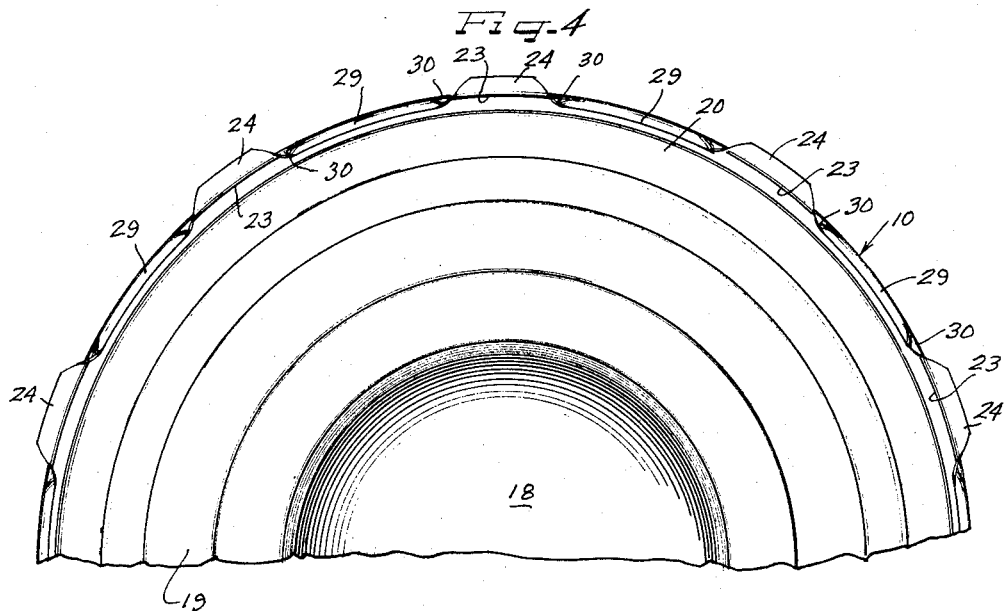
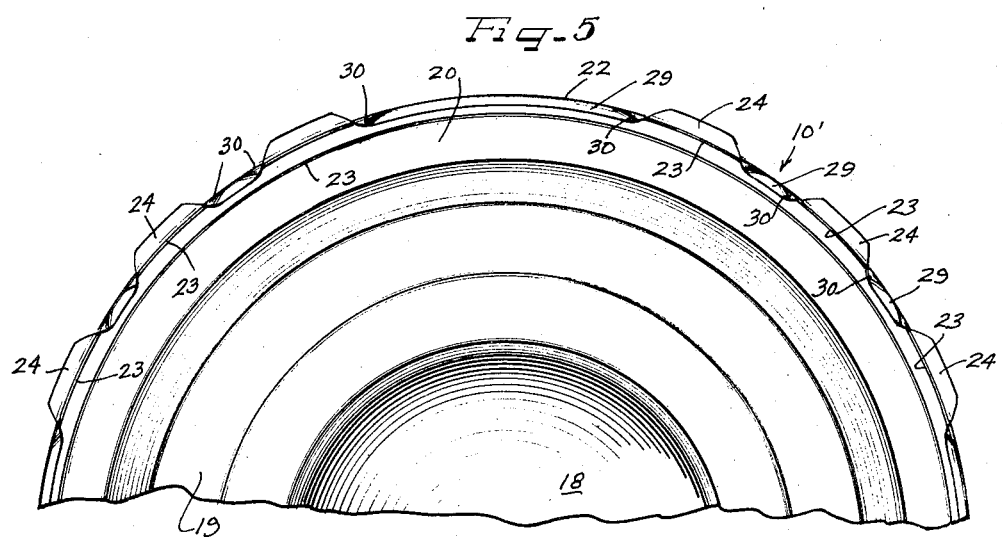
Inventor
GEORGE ALBERT LYON

United States Patent Office 2,860,926
Patented Nov. 18, 1958

2,860,926

WHEEL COVER

George Albert Lyon, Detroit, Mich.

Application June 7, 1956, Serial No. 589,949

4 Claims. (Cl. 301—37)

The present invention relates to improvements in wheel structures and more particularly concerns the ornamental and protective covering of the outer sides of vehicle wheels.

An important object of the present invention is to provide an improved wheel structure having cover means retainingly engageable with the terminal flange of the tire rim of the wheel.

Another object of the invention is to provide improved retaining means for wheel covers engageable with the terminal flange of the tire rim.

A further object of the invention is to provide an improved reinforced cover retaining flange means for wheel covers providing reinforcement for enhancing the resiliency of the flange means.

Yet another object of the invention is to provide improved pry-off means for covers having retaining finger structure engageable with the terminal flange of the tire rim of a small size wheel.

Other objects, features and advantages of the present invention will be readily apparent from the following detailed description of certain preferred embodiments thereof taken in conjunction with the accompanying drawings, in which:

Figure 4 is a fragmentary rear elevational view of the cover of Figures 1 through 3; and Figure 5 is a rear elevational view showing a modification of the cover with respect to the disposition of the retaining fingers.

Figure 1:
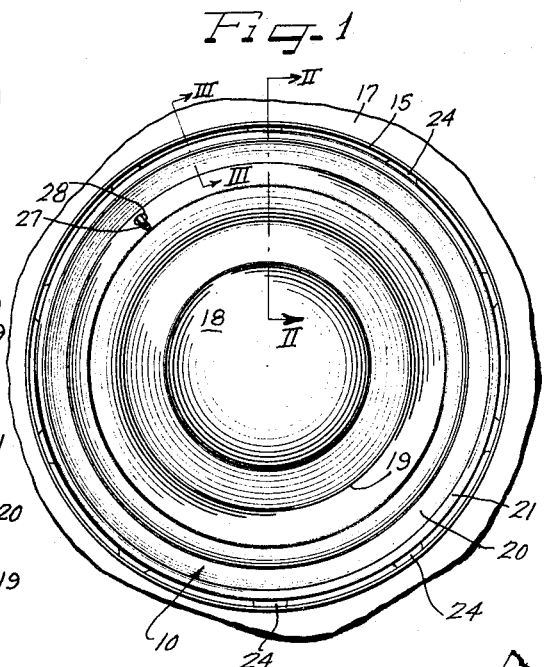
Figure 1 is an outer side elevational view of a wheel structure embodying features of the invention.
Figure 2:
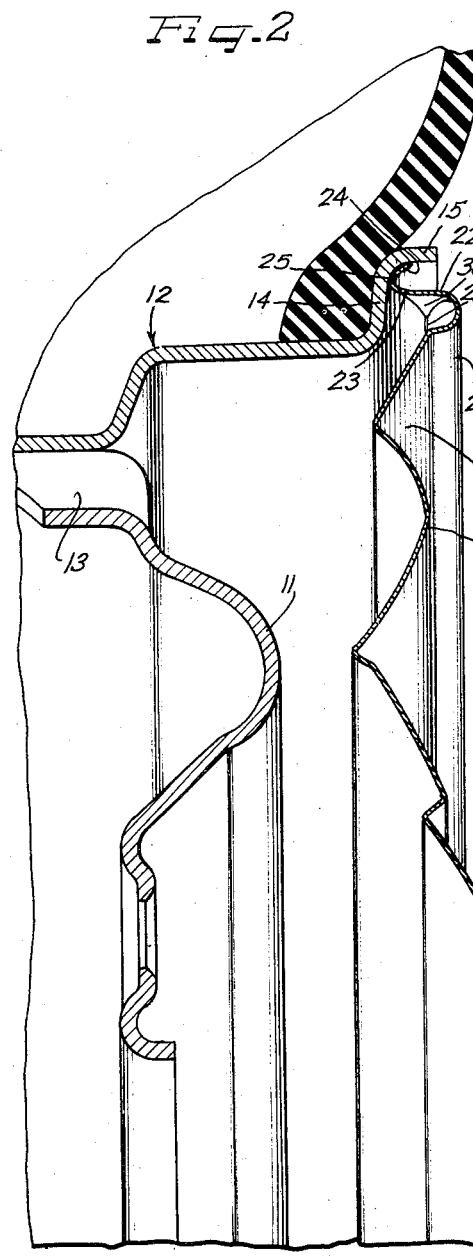
Figure 2 is an enlarged fragmentary radial sectional view taken substantially on the line II—II of Figure 1.

A wheel cover 10 embodying features of the invention is adapted to be applied to the outer side of a vehicle wheel including a disk spider wheel body 11 supporting a tire rim 12 and with wheel openings 13 at juncture of the wheel body with the tire rim. The tire rim is of the multi-flange drop center type having a terminal flange structure including a terminal flange having a generally radially outwardly projecting and axially outwardly facing portion 14 and a generally axially outwardly extending and radially inwardly facing extremity portion 15, the latter being preferably substantially straight with either a cylindrical formation or possibly angled off from the cylindrical on the order of 3° either radially outwardly or radially inwardly. A pneumatic tire 17 is adapted to be supported by the tire rim.

As shown, the cover 10 is of the full disk type although it may, of course, be a trim ring arranged to be assembled with a wheel having a hub cap. The cover is adapted to be formed as a sheet metal plate from suitable sheet material such as stainless steel, brass, or the like having suitable working characteristics for die stamping or drawing of the cover as a one piece structure.

Centrally the cover 10 has a crown portion 18 which joins an intermediate annular cover portion 19 leading into an outer annular marginal cover portion 20 adapted to overlie the tire rim 12. A reinforcing annular axially outwardly extending rib 21 may be provided at the radially outer extremity of the marginal portion 20, with a generally axially inwardly projecting cover retaining flange 22 extending to the inner side of the cover at the radially outer side of the rib 21.

Herein the flange 22 is provided for retaining the cover on the wheel. To this end, the flange 22 is of a diameter somewhat smaller than the inside diameter of the terminal flange extremity portion 15 and is provided with a circumferentially spaced series of cover retaining finger extensions 23. The flange 22 plus the finger extensions 23 presents a total length which in a preferred proportion is somewhat greater than the length of the terminal flange extremity portion 15, with the finger extensions 23 themselves extending beyond the extremity of the flange 22 proper less than the width of the terminal flange portion 15.

Each of the finger extensions 23 is of substantial width and preferably follows transversely generally the arcuate contour of the flange 22 and has the sides thereof preferably tapering from a maximum width at juncture with the flange 22 to a narrowest width in a short and relatively stiff generally radially and axially outwardly oblique retaining terminal flange or leg 24 presenting an edge normally projecting to a greater diameter than the inside diameter of the terminal flange portion 15 so as to be engageable in strong gripping edgewise cover retaining engagement with the inner face of the rim flange portion 15. Axially inward disposition of the cover on the wheel is determined by engagement of juncture shoulders 25 at the bends at which the terminal flanges 24 diverge from the body leg portions of the fingers 27 with the axially outwardly facing terminal flange portion 14.

In applying the cover 10 to the outer side of the wheel, the cover plate is generally centered with respect to the wheel and with a valve stem 27 registered through a valve stem opening 28 in the intermediate cover portion 19. Axially inward pressure is then applied to the cover to cam the retaining finger terminal flanges 24 inwardly past the tip of the terminal flange extremity portion 15 and into gripping retaining engagement at their tips with the terminal flange. It will be noted that since all of the retaining fingers 23 are connected together in the flange 22 the flange serves as a resilient tensioning means cooperative with the retaining fingers for effecting resilient radially outward thrust in the retaining fingers for enhancing the gripping of the terminals 24 with the rim flange, incident to radially inward deflection of the retaining fingers as the retaining terminals cam inwardly and are radially inwardly deflected from the normal greater diameter to which the tips of the fingers extend.

Substantial reinforcement of the flange 22 and finishing of the inner edge thereof between the fingers 23, as well as the provision of a strong pry-off shoulder structure substantially resistant to permanent deformation is afforded by having the inner edge of the flange 22 between the retaining fingers turned preferably generally radially inwardly. That is, the flange 22 is provided with a generally underturned reinforcing, pry-off shoulder means inner margin 29. Thereby, the edge of the flange 22 between the fingers 23 is turned generally radially inwardly, and avoiding sharp or cutting burrs that might possibly remain after fabrication and tend to injure a person handling the cover. At the sides of the respective retaining fingers 23, wing-like generally triangulate juncture portions 30 join the reinforcing, pry-off shoulder margin 29 to the retaining fingers. Since the juncture wings 30 extend angularly generally radially inwardly and circumferentially divergently at the respective opposite sides of the retaining fingers 23 and angularly not only to the fingers but also to the flange 22 and to the reinforcing underturned margin 29, a substantial resilient stiffening of the retaining fingers 23 is effected. This assures quite strong resilient tensioning thrust radially outwardly of the retaining fingers and thereby the retaining finger terminals 24 to enhance the gripping of the terminals against the surface of the rim flange portion 15.

Figure 3:
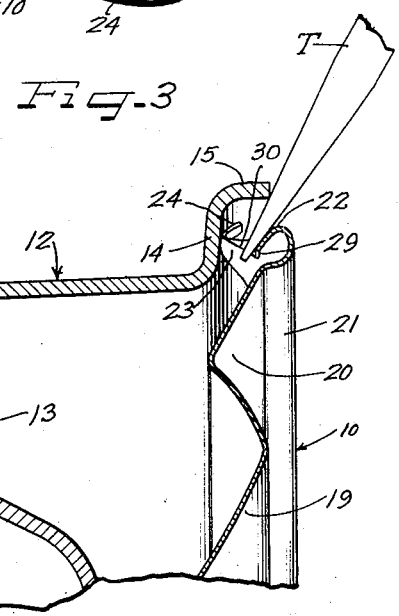
Figure 3 is a fragmentary enlarged sectional detail view taken substantially on the line III—III of Figure 1.

In Figure 3 it will be noted that the underturned reinforcing, pry-off shoulder margin 29 is disposed in the assembly with the wheel somewhat axially inwardly relative to the tip of the terminal flange extremity portion 15, and of course slopes obliquely, divergently generally radially and axially inwardly with respect to the rim flange portion 15. Accordingly, application of a pry-off tool by inserting the same into the gap between the cover flange 22 and the terminal flange portion 15 and inwardly behind the pry-off, reinforcing turned flange margin 29 is facilitated. After the tip of the pry-off tool has been thus positioned, fulcruming of the pry-off tool against the tip of the terminal flange portion 15 exerts axially outward cover displacing force on the cover margin and thus draws the adjacent retaining fingers 23 out of retaining engagement with the rim flange portion 15. The pry-off tool may comprise a screw-driver T or the like. By virtue of the reinforcement afforded by the shoulder, reinforcement turned marginal flange portion 29 of the cover substantial resistance to permanent deformation is provided, especially as compared to application of the pry-off tool directly to an axially inwardly facing edge. It will also be appreciated that by having the cover flange portion 29 sloping inwardly the tip of the pry-off tool is conveniently guided in behind the cover flange without any need to probe or hunt with the tool tip to get in behind the pry-off shoulder.

It may also be observed that since a substantial gap is provided between the turned flange marginal portion 29 between the fingers 23 and the axially facing portion 14 of the terminal flange, as well as a substantial gap between the flange 22 and the terminal flange extremity portion 15, circulation of air through such gaps and through the wheel openings 13 is facilitated. Furthermore, trapping of gravel or dirt behind the margin of the cover is avoided since the same may readily escape by centrifugal action in the running of the wheel.

As best seen in Figure 4, the retaining fingers 23 may be provided at equidistantly spaced intervals around the circumference of the cover, there being in the present instance ten of the fingers (Fig. 1). However, if preferred the retaining fingers may be disposed in groups in which the respective fingers of each group are more closely disposed relative to one another than the respective groups. That is, the groups are spaced apart further than the individual fingers in each group. For example, as shown in Figure 5, there may be three of the fingers in each group, with four groups, thus providing twelve fingers. Through such an arrangement the retaining fingers 23 may be derived from material at four corners of an original square sheet metal blank, so that some economy in material may be effected. Otherwise the cover, identifed as 10' in Figure 5 is the same as the cover 10, inclusive of the inturned reinforcing and pry-off inner margin 29 on the cover flange 22, at least between the groups of retaining fingers and preferably also between the individual fingers.

It will be understood that modifications and variations may be effected without departing from the scope of the novel concepts of the present invention.

I claim as my invention:

1. In a wheel structure including a tire rim having a terminal flange structure including a generally axially facing portion and a generally radially facing portion, a cover for disposition at the outer side of the wheel including an outer marginal portion with a generally axially inwardly extending flange of a smaller diameter than said radially facing rim flange portion and having cover retaining fingers extending therefrom arranged to bottom against the axially facing flange portion and having terminals directed generally radially outwardly and engageable retainingly under resilient tension of the fingers against the radially facing rim flange portion, the axially extending cover flange having an underturned inner marginal reinforcing and pry-off shoulder margin disposed in gap relation to both of said rim flange portions, said underturned flange shoulder margin extending generally radially and axially inwardly in a direction divergently relative to the plane of the inner face of the radially facing rim flange portion so as to facilitate insertion of the tip of a pry-off tool behind the turned flange marginal shoulder portion for fulcruming on the tip of the radially facing rim flange portion in prying the cover from the wheel, and generally radially inwardly projecting substantially triangular wing-like side portions of the fingers joining said shoulder margin and enhancing the resilient stiffness of the retaining fingers.

2. In a wheel structure including a radially facing portion, a cover for disposition over the outer side of the wheel including a circular member having a generally axially extending marginal flange for spaced generally telescopic disposition relative to said radially facing portion and having circumferentially spaced extensions providing retaining fingers with radially turned terminal portions for gripping engagement with the radially facing wheel portion under radially inward tensioned deflection of the fingers, said flange having between the fingers a reinforcing generally radially turned marginal structure engageable by a pry-off tool, said fingers having substantially triangular wing-like generally radially turned side flange portions joining said turned marginal structure and acting to enhance the resilient resistance to radial deflection of the finger extensions.

3. A wheel structure as defined in claim 1 wherein said outer marginal portion comprises an annular generally axially outwardly projecting rib of substantial stiffness from which said axially extending flange extends as the radially outer side of the rib.

4. A wheel structure as defined in claim 1 wherein the shoulder margin is oblique in a generally radially and axially inward plane to facilitate engagement thereof with the side of a pry-off tool inserted into said gap between the shoulder margin and the rim flange portions.

References Cited in the file of this patent

UNITED STATES PATENTS

| | | |
|---|---|---|
| 2,624,633 | Lyon | Jan. 6, 1953 |
| 2,690,357 | Lyon | Sept. 28, 1954 |